(12) United States Patent
Pellegatti et al.

(10) Patent No.: US 8,598,277 B2
(45) Date of Patent: Dec. 3, 2013

(54) POLYOLEFIN COMPOSITIONS HAVING IMPROVED SEALABILITY

(75) Inventors: Giampaolo Pellegatti, Boara (IT); Michele Grazzi, Casaglia (IT); Stefano Spataro, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/504,465

(22) PCT Filed: Nov. 18, 2010

(86) PCT No.: PCT/EP2010/067720
§ 371 (c)(1),
(2), (4) Date: Jun. 4, 2012

(87) PCT Pub. No.: WO2011/064131
PCT Pub. Date: Jun. 3, 2011

(65) Prior Publication Data
US 2012/0238704 A1    Sep. 20, 2012

Related U.S. Application Data

(60) Provisional application No. 61/283,264, filed on Dec. 1, 2009.

(30) Foreign Application Priority Data

Nov. 24, 2009  (EP) .................................... 09176916

(51) Int. Cl.
C08F 8/00    (2006.01)
C08L 23/00   (2006.01)
C08L 23/04   (2006.01)
C08L 23/10   (2006.01)

(52) U.S. Cl.
USPC ........................................ 525/191; 525/240

(58) Field of Classification Search
USPC .............................................. 525/191, 240
See application file for complete search history.

(56) References Cited

U.S. PATENT DOCUMENTS

| | | | |
|---|---|---|---|
| 4,399,054 A | 8/1983 | Ferraris et al. | |
| 4,472,524 A | 9/1984 | Albizzati | |
| 5,948,547 A | 9/1999 | Mikielski et al. | |
| 6,277,918 B1 | 8/2001 | Collina et al. | |
| 6,667,364 B2 | 12/2003 | Abraham et al. | |
| 2006/0020096 A1 | 1/2006 | Schottek et al. | |
| 2010/0230377 A1 | 9/2010 | Cavalieri et al. | |
| 2011/0190450 A1* | 8/2011 | De Palo et al. | 525/240 |
| 2011/0238027 A1* | 9/2011 | Di Pietro et al. | 604/372 |
| 2012/0171405 A1* | 7/2012 | Pasquali et al. | 428/36.9 |

FOREIGN PATENT DOCUMENTS

| | | |
|---|---|---|
| EP | 045977 | 2/1982 |
| EP | 483523 | 5/1992 |
| EP | 560326 | 9/1993 |
| EP | 0627464 | 12/1994 |
| EP | 0674991 | 10/1995 |
| WO | WO-98/40419 | 9/1998 |
| WO | WO-98/54251 | 12/1998 |
| WO | WO-00/11076 | 3/2000 |
| WO | WO-03/011962 | 2/2003 |
| WO | WO-03/031514 | 4/2003 |
| WO | WO-2004/048424 | 6/2004 |
| WO | WO-2004/099269 | 11/2004 |
| WO | WO-2006/042815 | 4/2006 |
| WO | WO-2008/017525 | 2/2008 |
| WO | WO-2009/000637 | 12/2008 |
| WO | WO-2009/024435 | 2/2009 |
| WO | WO-2009/068371 | 6/2009 |
| WO | WO-2010/034684 | 4/2010 |
| WO | WO-2010/069775 | 6/2010 |
| WO | WO-2011/061087 | 5/2011 |

OTHER PUBLICATIONS

Journal of Applied Physics, vol. 35,1964, p. 3241.
Office Action issued on Mar. 11, 2013 for the counter-part Chinese patent application No. 201080053267.7, 8 pages.

* cited by examiner

Primary Examiner — Nathan M Nutter

(57) ABSTRACT

Polyolefin composition with improved sealability comprising from 70 to 95% of one or more copolymers of propylene with one or more comonomers selected from ethylene, a $C_4$-$C_8$ α-olefin and combinations thereof, where the comonomer, or comonomers, content in (A) is from 5 to 25%, and from 5 to 30% by weight of butene-1 (co)polymer (B) having a flexural modulus of 60 MPa or less.

28 Claims, No Drawings

POLYOLEFIN COMPOSITIONS HAVING IMPROVED SEALABILITY

This application is the U.S. national phase of International Application PCT/EP2010/067720, filed Nov. 18, 2010, claiming priority to European Application 09176916.6 filed Nov. 24, 2009 and the benefit under 35 U.S.C. 119(e) of U.S. Provisional Application No. 61/283,264, filed Dec. 1, 2009; the disclosures of International Application PCT/EP2010/067720, European Application 09176916.6 and U.S. Provisional Application No. 61/283,264, each as filed, are incorporated herein by reference.

The present invention relates to polyolefin compositions comprising propylene copolymers and butene-1 polymers, useful in the preparation of heat-sealable films, and to the sheets and films thereof.

Crystalline copolymers of propylene with other olefins (mainly ethylene, butene-1 or both), or mixtures of such copolymers with other olefin polymers are known in the prior art as heat-sealable materials.

These crystalline copolymers are obtained by polymerizing propylene with minor amounts of other olefin comonomers in the presence of coordination catalysts.

The polymerized comonomer units are statistically distributed in the resulting copolymer and the melting point of said copolymers results to be lower than the melting point of crystalline propylene homopolymers. Also the seal initiation temperature (as later defined in detail) of the said copolymers results to be favorably low.

Many technical solutions are disclosed in the prior art in order to find a good balance between heat-sealability (as demonstrated by low seal initiation temperatures) and other useful properties, like solubility in organic solvents, optical properties (haze and gloss) and rheological properties.

In particular, published European patent application 483523 discloses compositions prepared directly in a polymerization process, having a low seal initiation temperature and a low content of a fraction soluble in xylene at room temperature or in n-hexane at 50° C. These compositions comprise (by weight):

30-60% of a copolymer of propylene and a $C_4$-$C_8$ α-olefin, containing 80-98% of propylene;

35-70% of a copolymer of propylene with ethylene and optionally 1-10% of a $C_4$-$C_8$ α-olefin, wherein the content of ethylene is 5-10% when the $C_4$-$C_8$ α-olefin is not present, or 0.5-5% when the $C_4$-$C_8$ α-olefin is present.

Published European patent application 674991 discloses other compositions prepared directly in a polymerization process, having a good ink adhesion in addition to a low seal initiation temperature and low content of a polymer fraction soluble in organic solvents. These compositions comprise (by weight):

20-60% of a copolymer of propylene with ethylene, containing 1 to 5% of ethylene;

40-80% of a copolymer of propylene with ethylene and a $C_4$-$C_8$ α-olefin, the ethylene content being 1-5% and the $C_4$-$C_8$ α-olefin content being 6-15%;

the total content of ethylene in the compositions being 1-5% and the total content of $C_4$-$C_8$ α-olefin in the compositions being 2.4-12%.

Other heat-sealable compositions, comprising two different kinds of copolymers of propylene with higher α-olefins, are disclosed in the published European patent application 560326 and in U.S. Pat. No. 5,948,547.

In WO 00/11076 heat-sealable compositions with improved properties are described. Such compositions, obtained by degradation of a precursor typically prepared by sequential polymerization, comprise (percent by weight):

20-80% of one or more propylene copolymers selected from the group consisting of (i) propylene/ethylene copolymers containing 1-7% of ethylene; (ii) copolymers of propylene with one or more $C_4$-$C_8$ α-olefins, containing 2-10% of the $C_4$-$C_8$ α-olefins; (iii) copolymers of propylene with ethylene and one or more $C_4$-$C_8$ α-olefins, containing 0.5-4.5% of ethylene and 2-6% of $C_4$-$C_8$ α-olefins, provided that the total content of ethylene and $C_4$-$C_8$ α-olefins be equal to or lower than 6.5%;

20-80% of one or more propylene copolymers selected from the group consisting of copolymers of propylene with one or more $C_4$-$C_8$ α-olefins, containing from more than 10% to 30% of $C_4$-$C_8$ α-olefins, and copolymers of propylene with ethylene and one or more $C_4$-$C_8$ α-olefins, containing 1-7% of ethylene and 6-15% of $C_4$-$C_8$ α-olefins.

In WO03031514 propylene polymer compositions having a particularly valuable balance of heat-sealability, low content of a fraction soluble in organic solvents and optical properties (in particular a very low Haze and high Gloss) are described, comprising:

A) from 15% to 60% of a copolymer of propylene with $C_4$-$C_8$ α-olefin(s), preferably butene, containing more than 10% but less than 14% of said $C_4$-$C_8$ α-olefin(s);

B) from 40% to 85% of a copolymer of propylene with $C_4$-$C_8$ α-olefin(s) containing from 14% to 30% of said $C_4$-$C_8$ α-olefin(s), and optionally from 0.5% to 3% of ethylene;

provided that the total content of $C_4$-$C_8$ α-olefin(s) in the propylene polymer composition be higher than 10%.

Such compositions can be subjected to degradation as well, to achieve the desired rheological properties, in particular a sufficiently high value of MFR (Melt Flow Rate).

It has now surprisingly been found that a further improved balance of heat-sealability and optical properties (in particular a low haze and high gloss) is obtained by blending a major amount of specific propylene copolymers with a butene-1 polymer having low values of flexural modulus.

Therefore the present invention provides polyolefin compositions comprising (by weight):

A) from 70 to 95%, preferably from 75 to 90%, more preferably from 80 to 90% of one or more copolymers of propylene with one or more comonomers selected from ethylene, a $C_4$-$C_8$ α-olefin and combinations thereof, where the comonomer, or comonomers, content in (A) is from 5 to 25%, preferably from 7 to 20%;

B) from 5 to 30%, preferably from 10 to 25%, more preferably from 10 to 20% of a butene-1 (co)polymer having:

a content of butene-1 derived units of 75 wt % or more, preferably of 80 wt % or more, more preferably of 84 wt % or more, even more preferably of 90 wt % or more;

a flexural modulus of 60 MPa or less, preferably of 40 MPa or less, more preferably 30 MPa or less.

The said amounts of A) and B) are referred to the total weight of A)+B).

As previously said, the compositions of the present invention have low seal initiation temperatures (preferably lower than 100° C., more preferably lower than 90° C.), low haze values (preferably lower than 1%, more preferably equal to or lower than 0.5%, measured on films according to the method described in the examples), and high gloss values (preferably higher than 85% o, measured on films according to the method described in the examples). In addition to the said balance of reduced heat-sealability and good optical properties, the compositions of the present invention are substantially free from gels (also called "fish eyes"), which is a measure of improved homogeneity and enhanced processability.

Particularly preferred among the compositions of the present invention are those having MFR values equal to or greater than 2 g/10 min., more preferably equal to or greater than 6 g/10 min., most preferably equal to or greater than 7 g/10 min., the upper limit being indicatively of 15 g/10 min. In fact such compositions are particularly suited for use in demanding melt-processing conditions, like those typically employed in the double bubble process for production of bioriented polypropylene (BOPP) films.

From the above definitions of propylene copolymer(s) (A), it is evident that the term "copolymer" includes polymers containing more than one kind of comonomers.

The $C_4$-$C_8$ α-olefins, as well as all the α-olefins hereinafter reported as comonomers in olefin copolymers, are selected from olefins having formula $CH_2$=CHR wherein R is an alkyl radical, linear or branched, or an aryl radical, having the appropriate number of carbon atoms; thus, for instance, from 1 to 8 carbon atoms for $C_3$-$C_{10}$ α-olefins, or from 2 to 8 carbon atoms for $C_4$-$C_{10}$ α-olefins.

Specific examples of $C_3$-$C_{10}$ α-olefins are propylene, butene-1, pentene-1,4-methylpentene-1, hexene-1 and octene-1.

Preferred examples of component (A) are the compositions comprising (by weight):
- $A^I$) 15-80%, preferably 20-60%, more preferably 20-50%, of one or more copolymers of propylene selected from the group consisting of ($A^I$1) propylene/ethylene copolymers containing 1-7% of ethylene; ($A^I$2) copolymers of propylene with one or more $C_4$-$C_8$ α-olefins, containing from 2 to less than 14% of the $C_4$-$C_8$ α-olefins; ($A^I$3) copolymers of propylene with ethylene and one or more $C_4$-$C_8$ α-olefins, containing 0.5-4.5% of ethylene and 2-6% of $C_4$-$C_8$ α-olefins, provided that the total content of ethylene and $C_4$-$C_8$ α-olefins in ($A^I$3) be equal to or lower than 6.5%;
- $A^{II}$) 20-85%, preferably 40-80%, more preferably 50-80%, of one or more copolymers of propylene selected from the group consisting of ($A^{II}$1) copolymers of propylene with one or more $C_4$-$C_8$ α-olefins, containing from 14% to 30%, preferably from 14.5% to 25% of $C_4$-$C_8$ α-olefins; (A" 2) copolymers of propylene with ethylene and one or more $C_4$-$C_8$ α-olefins, containing 0.5-5% of ethylene and 9-30% of $C_4$-$C_8$ α-olefins.

Particularly preferred examples of component (A) are the compositions comprising (by weight):
- $A^I$) from 15% to 60%, preferably from 20% to 60%, more preferably from 20% to 50%, of a copolymer of propylene with $C_4$-$C_8$ α-olefin(s), preferably butene, containing more than 10%, preferably 11% or more, but less than 14%, more preferably up to 13%-13.5%, of said $C_4$-$C_8$ α-olefin(s);
- $A^{II}$) from 40% to 85%, preferably from 40% to 80%, more preferably from 50% to 80%, of a copolymer of propylene with $C_4$-$C_8$ α-olefin(s), preferably butene, containing from 14% to 30%, preferably from 14.5% to 25%, more preferably from 14.5% to 22%, of said $C_4$-$C_8$ α-olefin(s), and optionally from 0.5% to 3% of ethylene;
provided that the total content of $C_4$-$C_8$ α-olefin(s) in the propylene polymer composition be higher than 10%.

Such compositions and their preparation are disclosed in the previously cited WO03/031514. The preferred comonomers in the said copolymers or of propylene are ethylene and butene-1. Preferably the total content of $C_4$-$C_8$ alpha-olefin (s) in the said propylene polymer composition comprising the components ($A^I$) and ($A^{II}$) is equal to or greater than 13%, more preferably greater than 14.5%, and up to 20%-25%.

Preferably the copolymer ($A^I$) is substantially free from ethylene.

Preferred MFR values for the propylene copolymers or propylene copolymer compositions (A) range from 2 to 15 g/10 min., more preferably from 2.5 to 10 g/10 min, measured at 230° C., with 2.16 kg load.

The said MFR values can be obtained directly in polymerization, or by subjecting to degradation a precursor polymer or polymer composition having lower MFR values.

All the said copolymers of propylene can be can be prepared by using a Ziegler-Natta catalyst or a metallocene-based catalyst system in the polymerization process.

The said catalysts and the polymerization processes are known in the art.

Conventional molecular weight regulators known in the art, such as chain transfer agents (e.g. hydrogen or $ZnEt_2$), may be used.

Preferred examples of Ziegler-Natta catalysts are the supported catalyst systems comprising a trialkylaluminium compound, optionally an electron donor, and a solid catalyst component comprising a halide or halogen-alcoholate of Ti and optionally an electron-donor compound supported on anhydrous magnesium chloride. Catalysts having the above-mentioned characteristics and polymerization processes employing such catalysts are well known in the patent literature; particularly advantageous are the catalysts and polymerization processes described in U.S. Pat. No. 4,399,054 and EP-A-45 977. Other examples can be found in U.S. Pat. No. 4,472,524.

Preferred examples of metallocene-based catalyst systems are disclosed in US2006/0020096 and WO98/040419.

The polymerization conditions in general do not need to be different from those used with Ziegler-Natta catalysts.

The so obtained copolymers of propylene can be blended in the molten state, with conventional apparatuses and techniques, to obtain the previously defined compositions. In alternative, the said compositions can be obtained directly in polymerization, by carrying it out in at least two sequential steps, wherein the copolymer components are prepared in separate subsequent steps, operating in each step in the presence of the polymer formed and the catalyst used in the preceding step.

The degradation treatment, when used, can be carried out by any means and under the conditions known in the art to be effective in reducing the molecular weight of olefin polymers.

In particular it is known that the molecular weight of olefin polymers can be reduced by application of heat (thermal degradation), preferably in the presence of initiators of free radicals, like ionizing radiations or chemical initiators.

Particularly preferred among the chemical initiators are the organic peroxides, specific examples of which are 2,5-dimethyl-2,5-di(t-butylperoxy)hexane and dicumyl-peroxide.

The degradation treatment with the chemical initiators can be carried out in the conventional apparatuses generally used for processing polymers in the molten state, like in particular single or twin screw extruders. It is preferred to operate under inert atmosphere, for instance under nitrogen.

The amount of chemical initiator to be added to the polyolefin composition can be easily determined by one skilled in the art, based upon the starting MFR value and the desired final MFR value. Generally such amount is comprised in the range of from 100 to 700 ppm.

The degradation temperature is preferably in the range of from 180 to 300° C.

The term "butene-1 (co)polymer" as used herein refers to butene-1 homopolymers, copolymers and compositions thereof, having from elastomeric to plastomeric behaviour and generically also referred to as "plastomers". The "butene-1 (co)polymer" component (B) exhibits low flexural modulus and preferably also low crystallinity (less than 40% measured via X-ray, preferably less than 35%).

Preferred α-olefins, which are or may be present as comonomers in the component (B) of the compositions of the invention, are ethylene, propylene and α-olefins of formula $H_2CH=CHR$, where R is $C_{3-6}$ linear or branched alkyl, like pentene-1, hexene-1,4-methyl-1-pentene and octene-1. Particularly preferred as comonomers are propylene and ethylene.

Component (B) has preferably shore A hardness (ISO868) equal to or less than 90 points.

It is preferably selected from the hereinafter described polymers (B1) to (B3).

(B1) is a butene-1 homopolymer or copolymer of butene-1 with at least another α-olefin, preferably with propylene as comonomer, having a percentage of isotactic pentads (mmmm %) from 25 to 55%, and optionally at least one of the following properties:
  intrinsic viscosity [η] measured in tetraline at 135° C. from 0.6 to 3 dL/g;
  amount of xylene insoluble fraction at 0° C. from 3 to 60 wt %.

(B2) is a butene-1/ethylene copolymer having a percentage of isotactic pentads (mmmm %) equal to or higher than 96%, and a total content of ethylene units in the range of 10-25% mol corresponding to about 5-15 wt %.

The butene-1/ethylene polymer (B2) can be advantageously a composition consisting of:
  a first copolymer having less than 10% mol of ethylene derived units, preferably from 1 to 9% mol, and
  a second copolymer having a content of ethylene derived units higher than 10% mol and for example in the range of 15-40% mol,
provided that the total content of ethylene derived units is in the above said range of 10-25% mol. The highly modified component (second copolymer) has typically an elastomeric behaviour and the component (B2) can be consequently an heterophasic composition.

(B3) is a butene-1 polymer having a distribution of molecular weights (Mw/Mn) measured by GPC lower than 3 and at least one of the following properties:
  no melting point (TmII) detectable at the DSC, measured according to the DSC method described herein below;
  a measurable melting enthalpy (ΔHf after aging. Particularly, the melting enthalpy of (B3) measured after 10 days of aging at room temperature, when present, is of less than 25 J/g, preferably from 4 to 20 J/g.

Thermal Properties Definition

The thermal properties (melting temperatures and entalpies) are determined by Differential Scanning Calorimetry (D.S.C.) on a Perkin Elmer DSC-7 instrument. The melting temperatures of butene-1 homo and co-polymers are determined according to the following detailed method.

TmI (melting temperature of crystalline form I) is the second peak temperature found in a DSC thermogram starting from the low-temperature side after TmII (melting temperature peak of the crystalline form II). TmI is measured, when present, after storing the sample at room temperature for 10 days to allow stabilization of the crystalline form I and II. It is infact known that when butene-1 based polymer are produced they usually crystallize from their solution in the tetragonal form II which then spontaneously transforms into the thermodynamically stable, trigonal form I, as reported in J. Appl. Phys. 1964, 35, 3241 and Macromolecules 1998, 31.

TmII (measured in second heating run): a weighted sample (5-10 mg) obtained from the polymerization is sealed into aluminum pans and heated at 200° C. with a scanning speed corresponding to 20° C./minute. The sample is kept at 200° C. for 5 minutes to allow a complete melting of all the crystallites. Successively, after cooling to −20° C. with a scanning speed corresponding to 10° C./minute, the peak temperature is taken as crystallization temperature (Tc). After standing 5 minutes at −20° C., the sample is heated for the second time at 200° C. with a scanning speed corresponding to 10° C./min. In this second heating run, the first peak temperature found starting from the low-temperature side is taken as the melting temperature (TmII) and the area as melting enthalpy (ΔHfII) of the crystalline form II, when present, that is also the global melting enthalpy in this measurement condition.

The melting enthalpy after 10 days: a weighted sample (5-10 mg) obtained from the polymerization is sealed into aluminum pans and heated at 200° C. with a scanning speed corresponding to 20° C./minute. The sample is kept at 200° C. for 5 minutes to allow a complete melting of all the crystallites. The sample is then stored for 10 days at room temperature. After 10 days the sample is subjected to DSC, it is cooled to −20° C., and then it is heated at 200° C. with a scanning speed corresponding to 10° C./min. In this heating run, the first peak temperature found starting from the low-temperature side is taken as the melting temperature (Tm substantially equal to TmII) and the area as global melting enthalpy after 10 days (ΔHf).

ΔHf is measured when the TmII (in second heating run) is not detectable (nd) and it is considered diagnostic of a low crystallinity exhibited in such case only after storage (10 days) at room temperature (25° C.).

The butene-1 (co)polymers (B1) and (B2) can be prepared by polymerization of the monomers in the presence of a low stereospecificity Ziegler-Natta catalyst comprising (a) a solid component comprising a Ti compound and an internal electron-donor compound supported on $MgCl_2$; (b) an alkylaluminum compound and, optionally, (c) an external electron-donor compound. In a preferred aspect of the process for the preparation of the (co)polymers (B1), the external electron donor compound is not used in order not to increase the stereoregulating capability of the catalyst. In cases in which the external donor is used, its amount and modalities of use should be such as not to generate a too high amount of highly stereoregular polymer, as described in the International application WO2006/042815. The butene-1 (co)polymers thus obtained typically have a content of isotactic pentads (mmmm %) from 25 to 55%. Butene-1 (co)polymers (B2) can be prepared by polymerization of the monomers in the presence of a stereospecific Ziegler Natta catalyst wherein the external electron donor compound (c) is chosen and used in amounts according to the process described in the international application WO2004/048424.

The polymerization process for butene-1 (co)polymers (B1) and (B2) can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred. The polymerization is generally carried out at temperature of from 20 to 120° C., preferably of from 40 to 90° C. The polymerization can be carried out in one or more reactors that can work under same or different reaction conditions such as concentration of molecular weight regulator, comonomer concentration, external electron donor concentration, temperature, pressure etc.

The butene-1 polymer (B3) can be a butene-1/ethylene copolymer or a butene-1/ethylene/propylene copolymer obtained by contacting under polymerization conditions butene-1 and ethylene and optionally propylene in the presence of a metallocene catalyst system obtainable by contacting:

a stereorigid metallocene compound;
an alumoxane or a compound capable of forming an alkyl metallocene cation; and, optionally,
an organo aluminum compound.

Examples of such butene-1 metallocene copolymers (B3), catalyst and process can be found in WO 2004/099269 and WO 2009/000637.

The process for the polymerization of butene-1 polymer (B3) according to the invention can be carried out in the liquid phase in the presence or absence of an inert hydrocarbon solvent, such as in slurry, or in the gas phase. The hydrocarbon solvent can either be aromatic such as toluene, or aliphatic such as propane, hexane, heptane, isobutane or cyclohexane. Preferably the polymers (B3) of the present invention are obtained by a solution process, i.e. a process carried out in liquid phase wherein the polymer is completely or partially soluble in the reaction medium.

As a general rule, the polymerization temperature is generally comprised between −100° C. and +200° C. preferably comprised between 40° and 90° C., more preferably between 50° C. and 80° C. The polymerization pressure is generally comprised between 0.5 and 100 bar.

The lower the polymerization temperature, the higher are the resulting molecular weights of the polymers obtained.

The butene-1 polymer (B3) can be advantageously also a composition consisting of:
i) 80 wt % or more butene-1 polymers having the above said properties of (B3),
ii) up to 20 wt % of a crystalline propylene polymer;
provided that the total content of ethylene and/or propylene derived units in the composition (i)+(ii) are present in amounts equal to or less than 25 wt %.

The overall handability of (i) can be advantageously improved by in line compounding up to 20 wt % of the said crystalline propylene polymer component (ii), without substantial deterioration of other mechanical properties. The crystalline propylene polymer has typically a value of melt flow rate (MFR) at 230° C., 2.16 kg of from 2 to 10 g/10 min, melting temperature DSC of from 130° C. to 160° C.

The compositions of the present invention are obtainable by melting and mixing the components, and the mixing is effected in a mixing apparatus at temperatures generally of from 180 to 310° C., preferably from 190 to 280° C., more preferably from 200 to 250° C.

Any known apparatus and technology can be used for this purpose.

Useful melt-mixing apparatus in this context are in particular extruders or kneaders, and particular preference is given to twin-screw extruders. It is also possible to premix the components at room temperature in a mixing apparatus.

The compositions of the present invention can also contain additives commonly employed in the art, such as antioxidants, light stabilizers, heat stabilizers, colorants and fillers.

Among the various applications made possible by the previously described properties, the compositions of the present invention are particularly useful for the preparation of films and sheets.

Films are generally characterized by a thickness of less than 100 μm, while sheets have generally a thickness greater than or equal to 100 μm.

Both films and sheets can be mono- or multilayer.

In the case of multilayer films or sheets, at least one layer comprises the compositions of the present invention. Each layer that does not comprise the compositions of the present invention can be composed of other olefin polymers, such as polypropylene or polyethylene.

Generally speaking, the films and sheets of this invention can be prepared by known techniques, such as extrusion and calendering. Specific examples of films containing the compositions of the present invention are disclosed hereinafter in the test for determining the seal initiation temperature (S.I.T.).

The particulars are given in the following examples, which are given to illustrate, without limiting, the present invention.

Unless differently stated, the following test methods are used to determine the properties reported in the detailed description and in the examples.

Ethylene and 1-butene content of the polymers
   Determined by I.R. spectroscopy.
Melt Flow Rate MFR
   Measured according to ISO 1133 at 230° C. with 2.16 kg load for propylene(co)polymers, at 190° C. with 2.16 kg load for butene-1 (co)polymers.
Intrinsic viscosity [η]
   Measured in tetraline at 135° C.
Flexural modulus
   Measured according to ISO 178.
Butene-1 polymers: Determination of Solubility in Xylene at 0° C. (% by weight)
   2.5 g of polymer are dissolved in 250 ml of xylene, at 135° C., under agitation. After 20 minutes, the solution is cooled to 0° C. under stirring, and then it is allowed to settle for 30 minutes. The precipitate is filtered with filter paper; the solution is evaporated under a nitrogen current, and the residue dried under vacuum at 140° C. until constant weight. The weight percentage of polymer soluble in xylene at 0° C. is then calculated. The percent by weight of polymer insoluble in xylene at room temperature is considered the isotactic index of the polymer.
Propylene polymers: Determination of Solubility in Xylene at room temperature (% by weight)
   2.5 g of polymer are dissolved in 250 ml of xylene, at 135° C., under agitation. After 20 minutes, the solution is cooled to 25° C. under stirring, and then it is allowed to settle for 30 minutes. The precipitate is filtered with filter paper; the solution is evaporated under a nitrogen current, and the residue dried under vacuum at 80° C. until constant weight. The weight percentage of polymer soluble in xylene at room temperature is then calculated. The percent by weight of polymer insoluble in xylene at room temperature is considered the isotactic index of the polymer. This value corresponds substantially to the isotactic index determined by extraction with boiling n-heptane, which by definition constitutes the isotactic index of polypropylene.

Melting temperature and fusion enthalpy
Determined by DSC according ISO 11357, part 3 with a heating rate of 20 K per minute.

MWD and $\overline{M}_w/\overline{M}_n$ determination by Gel Permeation Chromatography (GPC)

MWD and particularly the ratio $\overline{M}_w/\overline{M}_n$ is determined using a Waters 150-C ALC/GPC system equipped with a TSK column set (type GMHXL-HT) working at 135° C. with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140° C. for 1 hour.

The solution is filtered through a 0.45 μm Teflon membrane. The filtrate (concentration 0.08-1.2 g/l injection volume 300 μl) is subjected to GPC. Monodisperse fractions of polystyrene (provided by Polymer Laboratories) are used as standard. The universal calibration for butene-1 polymers is performed by using a linear combination of the Mark-Houwink constants for PS (K=7.11×10−5 dl/g; a=0.743) and PB(K=1.18×10−4 dl/g; α=0.725).

Determination of X-ray crystallinity

The X-ray crystallinity is measured with an X-ray Diffraction Powder Diffractometer using the Cu-Kα1 radiation with fixed slits and collecting spectra between diffraction angle 2Θ=5° and 2Θ=35° with step of 0.1° every 6 seconds.

Measurements are performed on compression molded specimens in the form of disks of about 1.5-2.5 mm of thickness and 2.5-4.0 cm of diameter. These specimens are obtained in a compression molding press at a temperature of 200° C.±5° C. without any appreciable applied pressure for 10 minutes, then applying a pressure of about 10 Kg/cm2 for about few second and repeating this last operation for 3 times.

The diffraction pattern is used to derive all the components necessary for the degree of crystallinity by defining a suitable linear baseline for the whole spectrum and calculating the total area (Ta), expressed in counts/sec·2Θ, between the spectrum profile and the baseline;

Then a suitable amorphous profile is defined, along the whole spectrum, that separate, according to the two phase model, the amorphous regions from the crystalline ones. Thus it is possible to calculate the amorphous area (Aa), expressed in counts/sec·2Θ, as the area between the amorphous profile and the baseline; and the crystalline area (Ca), expressed in counts/sec·2Θ, as Ca=Ta−Aa The degree of crystallinity of the sample is then calculated according to the formula:

% $Cr=100\times Ca/Ta$

Seal Initiation Temperature (S.I.T.)
Determined as follows.
Preparation of the film specimens Some films with a thickness of 50 μm are prepared by extruding each test composition in a single screw Collin extruder (length/diameter ratio of screw: 25) at a film drawing speed of 7 m/min. and a melt temperature of 210-250° C. Each resulting film is superimposed on a 1000 μm thick film of a propylene homopolymer having an isotacticity index of 97 and a MFR L of 2 g/10 min. The superimposed films are bonded to each other in a Carver press at 200° C. under a 9000 kg load, which is maintained for 5 minutes.

The resulting laminates are stretched longitudinally and transversally, i.e. biaxially, by a factor 6 with a TM Long film stretcher at 150° C., thus obtaining a 20 μm thick film (18 μm homopolymer+2 μm test composition).

2×5 cm specimens are cut from the films.

Determination of the S.I.T.

For each test two of the above specimens are superimposed in alignment, the adjacent layers being layers of the particular test composition. The superimposed specimens are sealed along one of the 5 cm sides with a Brugger Feinmechanik Sealer, model HSG-ETK 745. Sealing time is 5 seconds at a pressure of 0.1 N/mm² The sealing temperature is increased for each seal, starting from about 10° C. less than the melting temperature of the test composition. The sealed samples are left to cool and then their unsealed ends are attached to an Instron machine where they are tested at a traction speed of 50 mm/min.

The S.I.T. is the minimum sealing temperature at which the seal does not break/open when a load of at least 2 Newtons is applied in the said test conditions.

Haze on film

Determined on 50 μm thick films of the test composition, prepared as described for the S.I.T. test. The measurement is carried out on a 50×50 mm portion cut from the central zone of the film.

The instrument used for the test is a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze).

Gloss on film

Determined on the same specimens as for the Haze.

The instrument used for the test is a model 1020 Zehntner photometer for incident measurements. The calibration is made by carrying out a measurement at incidence angle of 60° on black glass having a standard Gloss of 96.2% and a measurement at an incidence angle of 45° on black glass having a standard Gloss of 55.4%.

EXAMPLE 1

The following materials are used as components A) and B).

Component A)

Propylene copolymer composition having a MFR of 5 g/10 min., prepared according to Example 6 of WO03/031514 and comprising, by weight:

$A^I$) 30%, of a copolymer of propylene with butene-1, containing 12% by weight of butene-1;

$A^{II}$) 70% of a copolymer of propylene with ethylene and butene-1, containing 1% by weight of ethylene and 16% by weight of butene-1.

The MFR of 5 g/10 min. is obtained by thermal treatment with peroxide of the as-polymerized composition, having starting MFR of about 1 g/10 min.

Component B)

Butene-1/propylene copolymer containing 4% by weight of propylene, having the following properties:

Flexural modulus of 45.9 MPa;

MFR of 38 g/10 min.;

percentage of isotactic pentads (mmmm %) of about 50%;

intrinsic viscosity [η] measured in tetraline at 135° C. of 0.87 dL/g;
amount of xylene insoluble fraction at 0° C. of 43 wt %;
hardness Sore A of 87.5.

Such copolymer was prepared using a catalyst and a polymerization process as described in WO2006/042815, followed by thermal treatment with an organic peroxide to increase the MFR from the as-polymerized value of about 0.5 g/10 min. to the said final value of 38 g/10 min.

Preparation of the Final Composition by Melt-Blending

The components (A) and (B) are melt-blended in the amounts reported in Table 1 and tested.

The film specimens are substantially free from gels.

The test results are reported in Table 1 as well.

Melt-blending is carried out under nitrogen atmosphere in a twin screw extruder, at a rotation speed of 250 rpm and a melt temperature of 200-250° C.

COMPARISON EXAMPLE 1

For comparison purpose, the properties of the (A) composition in the pure state are reported in Table 1.

TABLE 1

|  | Ex. 1 | Comparison Ex. 1 |
|---|---|---|
| Composition (% by weight) | | |
| Component A) | 85 | 100 |
| Component B) | 15 | 0 |
| Properties | | |
| MFR | 8.2 | 5 |
| S.I.T., ° C. | 85 | 98 |
| Haze, % | 0.16 | 0.10 |
| Gloss, ‰ | 92.2 | 90.6 |

The invention claimed is:

1. Polyolefin compositions comprising, all percentages being by weight:
A) from 70 to 95% of at least one copolymer of propylene with at least one comonomer selected from ethylene, a $C_4$-$C_8$ α-olefin and combinations thereof, where the comonomer content in (A) is from 5 to 25%, wherein component A) comprises, all percentages being by weight based upon the total weight of component A):
$A^I$) 15-80% of at least one copolymer of propylene selected from the group consisting of:
(${A^I}1$) propylene/ethylene copolymers containing 1-7% of ethylene;
(${A^I}2$) copolymers of propylene with at least one $C_4$-$C_8$ α-olefin, containing from 2 to less than 14% of the $C_4$-$C_8$ α-olefins; and
(${A^I}3$) copolymers of propylene with ethylene and at least one $C_4$-$C_8$ α-olefin containing 0.5-4.5% of ethylene and 2-6% of $C_4$-$C_8$ α-olefins, provided that the total content of ethylene and $C_4$-$C_8$ α-olefins in (${A^I}3$) be equal to or lower than 6.5%;
$A^{II}$) 20-85% of at least one copolymer of propylene selected from the group consisting of:
(${A^{II}}1$) copolymers of propylene with at least one $C_4$-$C_8$ α-olefin, containing from 14% to 30% of $C_4$-$C_8$ α-olefins;
(${A^{II}}2$) copolymers of propylene with ethylene and at least one $C_4$-$C_8$ α-olefin containing 0.5-5% of ethylene and 9-30% of $C_4$-$C_8$ α-olefins; and
B) from 5 to 30% of a butene-1 (co)polymer having:
a content of butene-1 derived units of at least 75 wt %; and
a flexural modulus of at most 60 MPa.

2. The polyolefin composition of claim 1, having an MFR of at least 2 g/10 min.

3. The polyolefin compositions of claim 1, wherein component A) comprises, all percentages being by weight:
$A^I$) from 15% to 60% of a copolymer of propylene with $C_4$-$C_8$ α-olefin(s), containing more than 10% of said $C_4$-$C_8$ α-olefin(s);
$A^{II}$) from 40% to 85% of a copolymer of propylene with $C_4$-$C_8$ α-olefin(s), containing from 14% to 30% of said $C_4$-$C_8$ α-olefin(s), and optionally from 0.5% to 3% of ethylene;
provided that the total content of $C_4$-$C_8$ α-olefin(s) in the propylene polymer composition be higher than 10%.

4. The polyolefin compositions of claim 1, wherein component A) has an MFR value from 2.5 to 10 g/10 min.

5. The polyolefin composition of claim 1, wherein component (B) is selected from:
B1) a butene-1 homopolymer or copolymer of butene-1 with at least another α-olefin, having a percentage of isotactic pentads (mmmm %) from 25 to 55;
B2) a butene-1/ethylene copolymer having a percentage of isotactic pentads (mmmm %) of at least 96%, and a total content of ethylene units in the range of 10-25% mol;
B3) a butene-1 polymer having a distribution of molecular weights (Mw/Mn) measured by GPC lower than 3 and at least one of the following properties:
no melting point (TmII) detectable at the DSC; and
a measurable melting enthalpy (ΔHf) after aging.

6. Mono- or multilayer films or sheets, wherein at least one layer comprises the compositions of claim 1.

7. The polyolefin compositions of claim 1 wherein the comonomer content in (A) is 7 to 20%.

8. The polyolefin compositions of claim 1 wherein in the butene-1 (co)polymer, the content of butene-1 derived units is at least 80 wt %.

9. The polyolefin compositions of claim 8 wherein in the butene-1 (co)polymer, the content of butene-1 derived units is at least 84 wt %.

10. The polyolefin compositions of claim 9 wherein in the butene-1 (co)polymer, the content of butene-1 derived units is at least 90 wt %.

11. The polyolefin compositions of claim 1 wherein the flexural modulus of component B) is at most 40 MPa.

12. The polyolefin compositions of claim 11 wherein the flexural modulus of component B) is at most 30 MPa.

13. The polyolefin compositions of claim 1 wherein component $A^I$) is present in an amount from 20 to 60%.

14. The polyolefin compositions of claim 13 wherein component $A^I$) is present in an amount from 20 to 50%.

15. The polyolefin compositions of claim 1 wherein component $A^{II}$) is present in an amount from 40 to 80%.

16. The polyolefin compositions of claim 15 wherein component $A^{II}$) is present in an amount from 50 to 80%.

17. The polyolefin compositions of claim 1 wherein the $C_4$-$C_8$ α-olefin content of (${A^{II}}1$) is 14.5% to 25%.

18. The polyolefin compositions of claim 3 wherein component $A^I$ is present in an amount from 20% to 60%.

19. The polyolefin compositions of claim 18 wherein component $A^I$ is present in an amount from 20% to 50%.

20. The polyolefin compositions of claim 19 wherein component $A^I$, the $C_4$-$C_8$ α-olefin is butene.

21. The polyolefin compositions of claim 3 wherein component $A^I$, the $C_4$-$C_8$ α-olefin content is at least 11% but less than 14%.

22. The polyolefin compositions of claim 21 wherein component $A^I$, the $C_4$-$C_8$ α-olefin content is at least 13% to 13.5%.

23. The polyolefin compositions of claim 3 wherein component $A^{II}$, is present in an amount from 40% to 80%.

24. The polyolefin compositions of claim 23 wherein component $A^{II}$, is present in an amount from 50% to 80%.

25. The polyolefin compositions of claim 3 wherein component $A^{II}$, the $C_4$-$C_8$ α-olefin is butene-1.

26. The polyolefin compositions of claim 3 wherein component $A^{II}$, the $C_4$-$C_8$ α-olefin is present in an amount from 14.5 to 25%.

27. The polyolefin compositions of claim 26 wherein component $A^{II}$, the $C_4$-$C_8$ α-olefin is present in an amount from 14.5 to 22%.

28. The polyolefin compositions of claim 5 wherein in component B1), the α-olefin is propylene.

* * * * *